Nov. 19, 1957  J. C. NOBLES ET AL  2,813,391
PEANUT SHAKER-WINDROWER

Filed Nov. 19, 1949  2 Sheets-Sheet 1

INVENTORS
JOE C. NOBLES
EDWARD L. RIETZ
BY

ATTORNEY

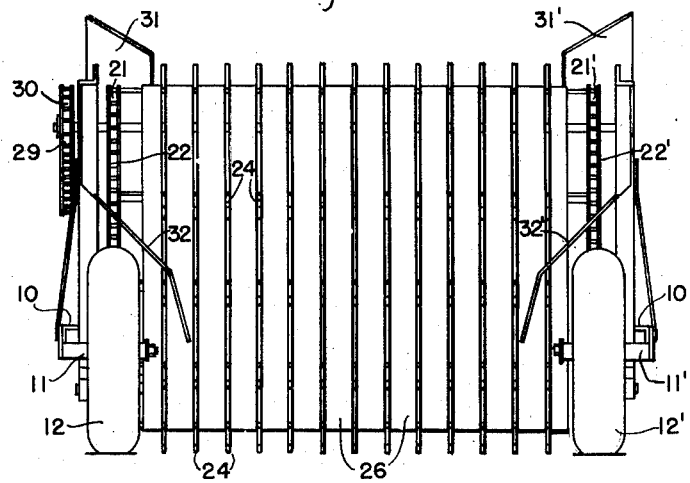
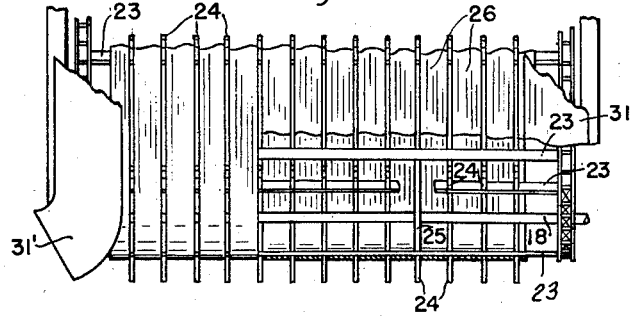

United States Patent Office 2,813,391
Patented Nov. 19, 1957

2,813,391
PEANUT SHAKER-WINDROWER

Joe C. Nobles and Edward L. Rietz, Albany, Ga., assignors to Lilliston Implement Company, Albany, Ga., a corporation of Georgia Application November 19, 1949, Serial No. 128,282

5 Claims. (Cl. 56—372)

This invention relates to a peanut shaker-windrower, and more particularly to a machine for picking up two rows of peanuts at a time, then shaking and dropping them together in one row.

Peanuts were formerly dug from the ground and stacked on poles for drying prior to picking. With the advent of the peanut combine, it has been found advantageous to windrow the peanut laden vine for drying prior to picking them up with the combine. It is an object of our invention to provide a machine which is constructed to pick up two rows of peanut laden vines which have been dug from the ground, shake them to remove dirt, and then drop them in one row for drying.

Another object of our invention is to provide a shaker-windrower having increased capacity and shaking action.

Another object of our invention is to provide a shaker-windrower which is simple in design, economical to construct, efficient in operation and durable in use.

Other and further objects and advantages will be apparent from the following description taken in connection with the accompanying drawing in which like characters of reference designate corresponding parts throughout the several views, and wherein:

Fig. 2 is a rear elevation of the machine shown in Fig. 1.

Fig. 3 is a fragmentary front elevation showing a detail.

Figure 1:
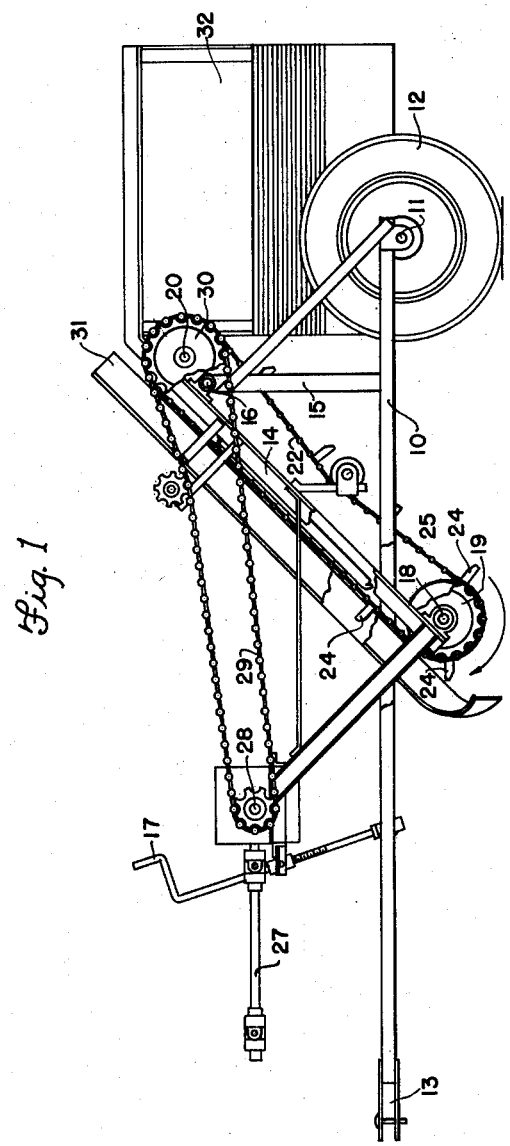
Fig. 1 is a side elevation of a machine embodying our invention.

In the embodiment chosen for purpose of illustration, a main frame having spaced side frame members 10, 10' carries near the rear thereof axle shafts 11, 11' which are supported upon the wheels 12, 12', respectively, upon which the machine rolls when pulled by a tractor (not shown) or other motive power force which may be attached to the draw-bar 13 which is secured to the front of the main frame.

An auxiliary frame 14 is inclined upwardly from the front toward the rear of the machine, and is pivotally supported at 16 on the upright frame members 15 so that the height of the front end of the auxiliary frame above ground may be adjusted by adjusting the angle of inclination. In order to so adjust the auxiliary frame, a screw threaded hand crank 17 is provided to adjust the height of the front end of the auxiliary frame with respect to the main frame.

A lower shaft 18 extends from side to side across the auxiliary frame and is mounted for rotation adjacent the lower front end thereof. This shaft carries a lower chain sprocket 19 adjacent each side of the auxiliary frame. An upper shaft 20 also extends from side to side across the auxiliary frame and is mounted for rotation adjacent the upper rear end thereof. This shaft carries the upper chain sprockets 21, 21' which are similarly placed adjacent each side of the auxiliary frame 14 for cooperation, respectively, with a lower chain sprocket 19. Sprocket chain 22 runs over upper sprocket 21 and the corresponding lower sprocket 19. Sprocket chain 22' runs over upper sprocket 21' and the corresponding lower sprocket 19.

Fastened between the sprocket chains 22 and 22' for movement therewith are a plurality of pick-up bars 23 which carry the pickup pins or blades 24, there being a plurality of each such pins rigidly attached to each pick up bar. One or more supporting discs 25 are mounted on each of the shafts 18 and 20, respectively, to support the pick-up bars 23 intermediate their ends and between the sprockets on each said shaft.

The pick-up bars 23 are connected together by belts or strips 26 which may be made of fabric, metal or other suitable material. These belts 26 are placed between adjacent pick-up pins, being fastened to each of the pick-up bars and being spaced apart laterally so as to permit dirt and other foreign matter shaken from the peanuts to fall between them.

Power is applied to the machine from the draft element, or other source of power, through drive shaft 27, transverse shaft 28 and sprocket chain 29 which drives sprocket wheel 30 keyed to upper shaft 20.

In operation, our machine is pulled along over the material to be shaken and windrowed, such as peanut laden vines dug from the ground and lying where they were dug. The pick up bars 23 are of a length to span two rows, and as power applied through the drive shaft 27 causes the pick up bars to pass upwardly and over the inclined auxiliary frame, the pick up pins 24 engage the vines and lift them from the ground onto the inclined plane. Hand crank 17 is used to adjust the height of the front end of the auxiliary frame above ground so that the pick up pins will engage the vines but will not become caught in the ground. Sideboards 31, 31' are arranged on opposite sides of the machine to confine the vines picked up and prevent them from spilling off the ends of the pick up bars. The peanut laden vines are carried up and over the inclined auxiliary frame by the pick up bars and the interconnecting belts 26 and doffed at the rear of the machine onto or between the oppositely disposed inturned fenders 32, 32' which converge the vines into a single windrow.

The belts or strips 26 serve to strengthen the pick up bars 23 by distributing the load among them and thus allowing lighter weight pick up bars to be used or permitting heavier loads to be handled with a given bar. Also, the flexing of the strips 26 serves to speed up or increase the shaking action, thus resulting in more thorough cleaning.

The discs 25 support the pick up bars between the chain sprockets and thus take much of the wear off of the sprockets. These discs also serve to strengthen the pick up bars by their added support.

We have illustrated and described our invention in a very practical embodiment thereof without attempting to illustrate or describe other embodiments and adaptations which we contemplate. Various changes and modifications may be made in the embodiment shown and described without departing from the scope of our invention as defined in the appended claims.

We claim:

1. In a device for picking up and shaking peanut vines, an inclined endless conveyor comprising flights, a pair of elements carrying said flights, said flights having spaced vine-engaging tines extending outwardly therefrom, the tines of succeeding flights being in alignment, and flexible belt members between said aligned tines and being substantially coextensive with said flight carrying elements.

2. In a device for picking up and shaking peanut vines, an inclined endless conveyor comprising successive flights, a pair of spaced flexible endless elements carrying said flights, each flight having a row of parallel spaced vine-engaging tines extending outwardly therefrom, the tines of succeeding flights being in alignment, and spaced endless flexible belt members between said aligned tines engaging said flights and being substantially coextensive with said flight carrying elements.

3. In a device for picking up and shaking peanut vines, an inclined endless conveyor comprising flights, a pair of elements carrying said flights, said flights having spaced vine-engaging tines extending outwardly therefrom, the tines of succeeding flights being in alignment, flexible belt members between said aligned tines and being substantially coextensive with said flight carrying elements, means for driving said elements, and means for supporting said flights intermediate said elements during a portion of their travel with said elements.

4. In a device for picking up and shaking peanut vines, an inclined endless conveyor comprising parallel flights, each formed by a flexible transverse bar, a driven pair of spaced endless elements respectively engaging the ends of each said bar, said flights having spaced vine-engaging tines extending outwardly therefrom, the tines of succeeding flights being in alignment, flexible belt members engaging said bars between said aligned tines and being substantially coextensive with said flight carrying elements, spaced sprockets over which said elements are trained, a shaft joining said sprockets, and means on said shaft for supporting said bars intermediate said sprockets.

5. In a device for picking and shaking peanut vines, an inclined endless conveyor comprising successive flights, each formed by a thin flexible transverse bar, a pair of endless parallel chains carrying said flights, and respectively engaging the ends of each said bar, each bar having a row of parallel spaced vine-engaging tines extending outwardly therefrom, the tines of succeeding flights being in alignment, spaced flexible belt members engaging said bars between said aligned tines and being substantially coextensive with said flight carrying chains, opposed spaced pairs of chain sprockets over which said chains are trained, shafts between each pair of sprockets, means for driving one pair of said sprockets to move said chains, the motion of said chains imparting rotation to the other pair of sprockets and their shaft, and discs fixed on said last mentioned shaft for rotation therewith and engageable with each said bar to provide intermediate support therefor between said last mentioned pair of sprockets.

References Cited in the file of this patent
UNITED STATES PATENTS

| | | |
|---|---|---|
| 1,257,510 | Mason | Feb. 26, 1918 |
| 2,253,797 | Melroe | Aug. 26, 1941 |
| 2,385,829 | Melroe | Oct. 2, 1945 |
| 2,499,051 | Beaver | Feb. 28, 1950 |
| 2,570,065 | Melroe | Oct. 2, 1951 |